United States Patent
Kulkarni et al.

(10) Patent No.: US 10,114,782 B2
(45) Date of Patent: Oct. 30, 2018

(54) USB TYPE C DUAL-ROLE-PORT UNATTACHED DUTY CYCLE RANDOMIZATION

(71) Applicant: NXP B.V., Eindhoven (NL)

(72) Inventors: Abhijeet Chandrakant Kulkarni, Chandler, AZ (US); Kenneth Jaramillo, Gilbert, AZ (US)

(73) Assignee: NXP B.V., Eindhoven (NL)

( * ) Notice: Subject to any disclaimer, the term of this patent is extended or adjusted under 35 U.S.C. 154(b) by 130 days.

(21) Appl. No.: 15/277,677

(22) Filed: Sep. 27, 2016

(65) Prior Publication Data

US 2018/0089123 A1 Mar. 29, 2018

(51) Int. Cl.
| | | |
|---|---|---|
| G06F 13/20 | (2006.01) | |
| G06F 13/38 | (2006.01) | |
| G06F 13/40 | (2006.01) | |
| G06F 13/42 | (2006.01) | |

(52) U.S. Cl.
CPC ........ *G06F 13/385* (2013.01); *G06F 13/4022* (2013.01); *G06F 13/4072* (2013.01); *G06F 13/4282* (2013.01); *G06F 2213/0026* (2013.01)

(58) Field of Classification Search
CPC ..... G06F 1/266; G06F 13/4282; G06F 13/385
See application file for complete search history.

(56) References Cited

U.S. PATENT DOCUMENTS

| | | | |
|---|---|---|---|
| 6,384,651 B1 | 5/2002 | Horigan | |
| 9,400,546 B1* | 7/2016 | Agarwal | ............... G06F 1/3287 |
| 2012/0005377 A1 | 1/2012 | Kim et al. | |
| 2015/0370299 A1* | 12/2015 | Waters | ...................... G06F 1/26 |
| | | | 713/310 |
| 2016/0170909 A1* | 6/2016 | Gerhart | ..................... G09C 1/00 |
| | | | 713/193 |
| 2016/0188514 A1* | 6/2016 | Forghani-Zadeh | ... G06F 13/385 |
| | | | 710/313 |
| 2016/0190794 A1* | 6/2016 | Forghani-Zadeh | ...... H02H 7/20 |
| | | | 361/86 |
| 2016/0191313 A1* | 6/2016 | Chen | ................... H04L 41/0816 |
| | | | 370/315 |
| 2016/0283423 A1* | 9/2016 | Srivastava | ............ G06F 13/362 |
| 2016/0285757 A1* | 9/2016 | Srivastava | .............. H04L 12/10 |
| 2016/0371218 A1* | 12/2016 | Roberts-Hoffman | ........................ G06F 12/0246 |
| 2017/0052578 A1* | 2/2017 | Agarwal | ................. G06F 1/263 |
| 2017/0147526 A1* | 5/2017 | Chen | ................... G06F 13/4282 |
| 2017/0160735 A1* | 6/2017 | Mikan | .................. G05D 1/0005 |

OTHER PUBLICATIONS

"Hardware Design Guidelines for Dual Role Port Applications Using EZ-PD USB Type-C Controllers" by www.cypress.com, Mar. 2, 2016.*

(Continued)

*Primary Examiner* — Jing-Yih Shyu

(57) ABSTRACT

A universal serial bus (USB) circuit includes a USB interface configured to transmit and receive power and data, a random number generator circuit configured to generate a random number, and a controller configured to receive the random number and to select a dual role port (DRP) duty cycle and to select a DRP duration based upon the random number, wherein the DRP duty cycle time and DRP duration are used when connecting a USB type-C DRP device to another USB type-C DRP device.

20 Claims, 3 Drawing Sheets

(56) References Cited

OTHER PUBLICATIONS

Texas Instrument's USB type-C based part's Datasheet.
Texas Instruments; "TUSB320 USB Type-C (TM) Configuration Channel Logic and Port Control"; Datasheet TUSB320, TUSB3201; 33 pages (Jun. 2016).
USB type-C Committee's Specification State Machine Description.

* cited by examiner

USB TYPE C DUAL-ROLE-PORT UNATTACHED DUTY CYCLE RANDOMIZATION

TECHNICAL FIELD

Various exemplary embodiments disclosed herein relate to dual role port (DRP) connectivity for Universal Serial Bus (USB) applications.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Various exemplary embodiments are related to a universal serial bus (USB) circuit, including a USB interface configured to transmit and receive power and data, a random number generator circuit configured to generate a random number, and a controller configured to receive the random number and to select a dual role port (DRP) duty cycle and to select a DRP duration based upon the random number, wherein the DRP duty cycle time and DRP duration are used when connecting the USB interface of a first USB type-C DRP device to a USB interface of a second USB type-C DRP device.

The USB circuit may include a configuration channel (CC) line, a pull up resistor to pull the CC line to a first voltage source, and a pull down resistor to pull the CC line to a second voltage source.

A first switch may be connected between the controller and pull up resistor and a second switch connected between the controller and pull down resistor.

A third switch may be connected to the CC line to communicate the DRP duty cycle and DRP duration to the USB interface of the first USB type-C DRP device.

The controller may alternate a state of the DRP between a first state and a second state, wherein the pull down resistor is connected to the USB interface of the first USB type-C DRP device in the first state and the pull up resistor is connected to the USB interface of the first USB type-C DRP device in second state.

Various exemplary embodiments are also related to a method of connecting a universal serial bus (USB) interface of a first USB type-C DRP device to a USB interface of a second USB type-C DRP device, including generating a random number by a random number generator circuit in the USB interface of the first device, and selecting a dual role port (DRP) duty cycle and selecting a DRP duration based upon the random number, wherein the DRP duty cycle and DRP duration are used to connect the USB interface of the first device to the second device.

An advertised DRP mode of the first device and an advertised DRP mode of the second device may be different for a time sufficient for the devices to attach to one another.

The method may include alternating a state of a DRP of the first device between a first state and a second state including connecting a pull down resistor to a USB interface in the first state and connecting a pull up resistor to a USB interface in a second state.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

DETAILED DESCRIPTION

Figure 1:
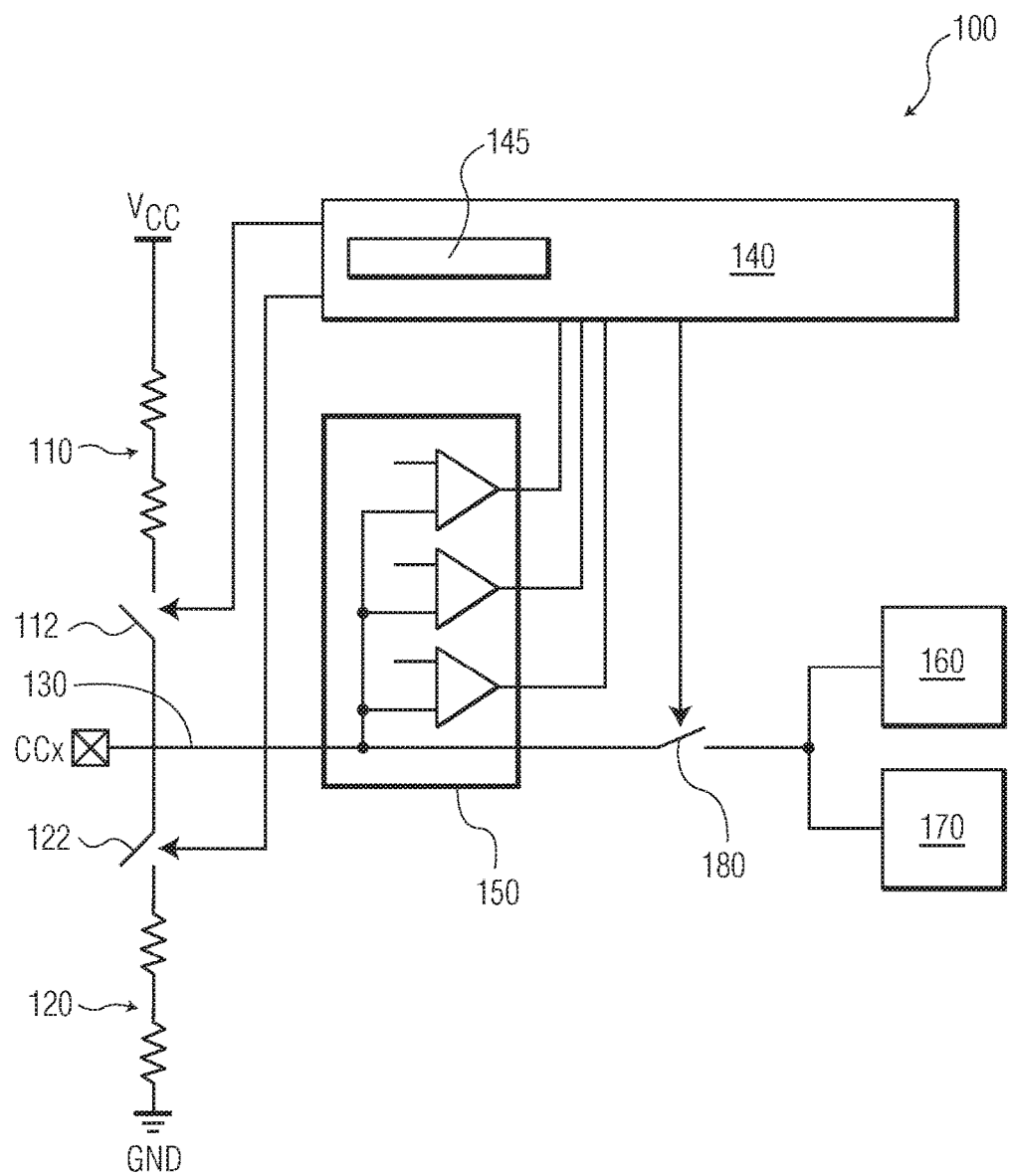
FIG. 1 illustrates a block circuit diagram of controlling Rp and Rd on a CC line in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated. Descriptors such as "first," "second," "third," etc., are not meant to limit the order of elements discussed, are used to distinguish one element from the next, and are generally interchangeable.

USB has earned a reputation of being the most widely used and most popular interface. The latest type-C plug/receptacle mechanical pinout is touted to be "the last interface" because of its small form factor, flippability on side, and an ability to be used on both ends of a cable. Such flexibility makes USB very appropriate and appealing to fulfill the power and data requirements of portable gadgets, computing devices, and other electronic apparatuses. A cable with a USB interface attached to a USB type-C DRP device can be used as a simple data and/or power cable, and it can also fit high-end applications with power ratings of up to 100 W, data flow of up to 10 Gbps, and alternate modes like Display-Port, HDMI or any custom interface.

The USB type-C specification describes different modes supported and functional behavior of devices. One application described is a Dual-Role-Port (DRP) type of device that may alternate between advertising a Pull-up resistor (Rp) and Pull-down resistor (Rd) in a quest to find out whether a device or a host is connected to the other end of a cable.

Embodiments described herein use a randomizer circuit based duty-cycle of the durations of repetitive pull-up/pull-down advertisements. An unconnected device according to the embodiments described herein gains a faster chance of detecting and locking to another DRP type of device on the other end of a USB cable.

In the USB type-C specification a USB interface connected at a proximal end to one side of a power supply or USB type-C DRP device and unattached on a distal end thereof may present the distal unconnected end as an Upstream Facing Port (UFP), or a Downstream Facing Port (DFP), or a Dual Role Port (DRP) when connecting to another electronic device.

In a UFP role, the unattached USB interface may indicate that it is a power sink on the cable power bus VBUS line. To indicate this preference, the unattached USB interface will continuously apply pull-down resistors (Rd) to GND on both configuration channel (CC) lines of the VBUS.

In a DFP role, the unattached USB interface may indicate that it can be a power source on VBUS. The unattached USB interface will continuously apply pull-up resistors (or current sources) (Rp) to $V_{CC}$ on both of the CC lines of the VBUS.

In a DRP role, the unattached USB interface of a USB type-C DRP device may indicate that it can either be a power sink or power source, on VBUS, depending on the other end of the cable getting attached to a device (UFP) or a host (DFP). To indicate this preference, the unattached USB interface will alternate between applying pull-down resistors (Rd) on both of the CC lines and then applying pull-up resistors (or current sources) (Rp) on both the CC lines.

When a USB connector configured as DRP gets attached with a UFP or a DFP, the USB interface will detect the attach event, and will stop alternating between the Rp and Rd, and will stay with either Rp (if attached to an UFP), or Rd (if attached to a DFP).

In the event of a DRP getting attached to another DRP, both ports will indicate alternating in sync Rp, Rd roles, and the DRP interfaces may alternate in a mirrored type relationship indicating Rp with Rp and Rd with Rd at the same time, and not attach.

Embodiments described herein insert a randomizer circuit in a type-C controller to cause randomization in a duty-cycle of the alternating Rp, Rd roles to reduce the attach process duration. With randomization of the Rp/Rd duty cycle, an unattached USB interface of a USB type-C DRP device configured as DRP will randomly advertise as a SOURCE or SINK and quickly match up with an opposite signal in the device or host being attached which may also have a randomized Rp/Rd duty cycle.

Embodiments described herein include a random number generator circuit configured to generate a random number and a controller configured to receive the random number and select a tDRP value (duration of one DRP cycle of Source to Sink and back advertisement), and also a dcSRC.DRP value (the % of time of tDRP for which a DRP will exhibit an Rp or Rd pair on both CC lines). The Type C specification includes a pair of CC lines per port. For ease of understanding, the figures illustrate one CC line of the pair. The USB type C specification suggests tDRP to be between 50 ms to 100 ms and dcSRC.DRP to be 30% to 70%. For example, if the random number is selected as having a value from 0 to 1, then the random value may be used to select values for tDRP and dcSRC.DRP in the allowable ranges according to the specification. Alternatively, the random number generator circuit may generate a random number between 50 and 100 to indicate the number of ms for tDRP and may generate another random number between 30 and 70 to indicate the percentage value for dcSRC.DRP.

Instead of a design that uses fixed values for tDRP and dcSRC.DRP, embodiments described herein use values (within the specified limits) generated randomly to increase the chances of two DRPs quickly attaching to one another.

FIG. 1 illustrates a circuit diagram 100 of a portion of a USB interface configured to control Rp and Rd on a CC line 130 in accordance with embodiments described herein.

In the circuit diagram 100 of FIG. 1, a controller 140 includes a line feedback shift register (LFSR) 145 to generate at least one random (or pseudo-random) value. The random value is used to determine how long to enable Rp or Rd. The circuit 100 includes a pull-up resistor 110 that may be pulled up to a reference voltage $V_{CC}$ to represent a power source status, and a pull down resistor 120 that may be pulled down to ground GND to represent a power sink status. Depending on a DRP cycle, switch 112 may receive a signal from the controller 140 to connect or disconnect $V_{CC}$ to the CC line 130 through the pull up resistor 110, and switch 122 may receive an alternate signal from the controller 140 to alternatively connect or disconnect GND to the CC line 130 through the pull down resistor 120. The switch 112 and switch 122 operate so that when one is closed the other is open.

The circuit 100 may also include a plurality of comparator circuits 150. Depending on whether $V_{CC}$ or GND is connected on the CC line 130, the plurality of comparators 150 may compare the received voltage level to make state decisions within the controller 140.

Figure 2:
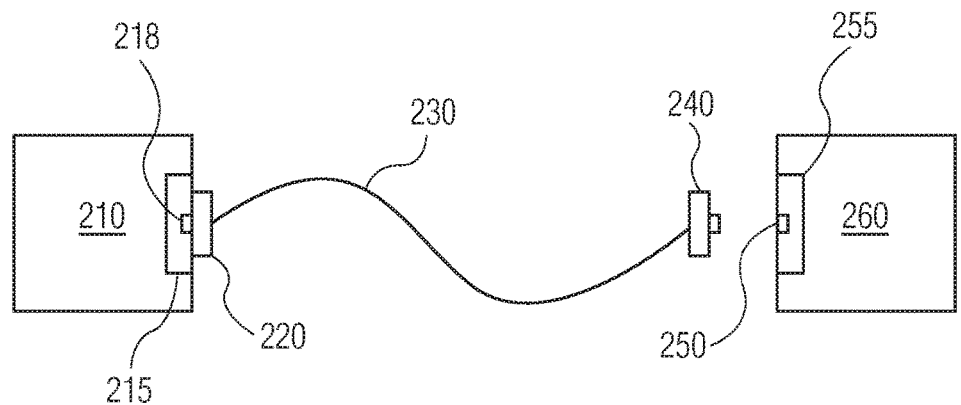
FIG. 2 illustrates a USB cable connected to a power supply and connecting device in accordance with embodiments described herein.

The circuit 100 also includes a receiver 160 and transmitter 170 pair at a port side of the DRP interfaces 215 and 255 (illustrated in FIG. 2). When a signal along CC line 130 is transmitted, switch the controller 140 controls a switch 180 to switch on and convey alternating Rp and Rd for the specified duration according to the random value generated by the LFSR 145 on the designated Rx 160 or Tx 170 line. For example, when the controller 140 controls switch 112 to be ON and switch 122 to be OFF, and conducts a $V_{CC}$ on the CC line 130, switch 180 is closed and power may be advertised as a DFP at the transmission port 170. Alternatively, when the controller 140 controls switch 112 to be OFF and switch 122 to be ON, the GND signal placed on the CC line 130 and advertised through receive port 160 of the DRP.

FIG. 2 illustrates a USB type C cable 230 connected to a power supply 210 having a USB interface 215 and port 218 that may be configured as a DRP. The DRP port 218 may connect to a first connector 220 of the USB Type-C cable 230, which in turn may connect to an electronic device 260 in accordance with embodiments described herein. The power supply 210 may be a standalone power supply or a USB port of an electronic device that may operate as a power supply to provide power to the electronic device 260. Although element 210 may be labeled a power supply and connecting device 260 receives power from the power supply 210, these designations are interchangeable and power may flow in both directions.

Referring to FIGS. 1 and 2, the power supply 210 may be connected to the first connector 220 of the USB Type C cable 230 at a proximal end thereof. A distal end of the USB Type C cable 230 may have an unattached second USB connector 240 to be connected to the electronic device 260. Both of the power supply 210 and the connecting device 260 include circuits 100 described herein. The integrated circuits 100 may be located within interface 215 of the power supply 210, and at interface 255 of the connecting device 260. DRP ports 218 and 250 are respectively connected to interfaces 215 and 255.

The second connector 240 may be configured to plug into the connection port 250 of the electronic device 260. When the unattached USB interface connector 240 is plugged into the electronic device 260, such as a device 260 having a DRP port 250, based on the generated random number by the LFSR 145 to produce a random DRP duty cycle and Rp or Rd duration, a controller 140 of the power supply 210 and/or a controller 140 of the electronic device 260 may alternately toggle the switches 112 and 122 according to the random DRP duty cycle. In other words, either or both of the controllers 140 will decide the time and durations when Rp or Rd will be advertised on the CC line 130. The random DRP duty cycle and duration may enable a DRP configured interface 215 to quickly attach to a DRP configured interface 255 of the connecting device 260.

Figure 3:
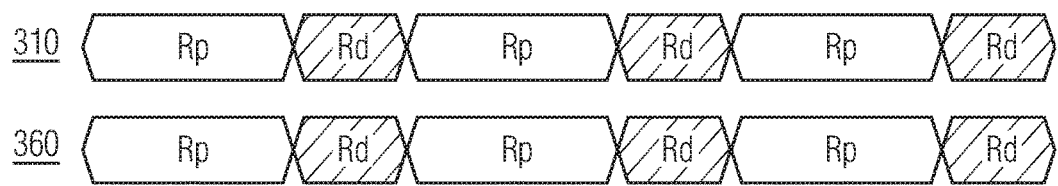
FIG. 3 illustrates a representation of phase alignment between a plurality of DRPs in accordance with embodiments described herein.

FIG. 3 illustrates a representation of phase alignment between a plurality of DRPs in accordance with embodiments described herein. As illustrated in FIG. 3, a first device advertising a DRP port is represented at 310. A second device advertising a DRP port is represented at 360. As illustrated in FIGS. 2 and 3, if both devices 310 and 360 using a DRP connector have a same implementation, picking the same values for tDRP and dcSRC.DRP, both devices 310 and 360 may get locked in phase while advertising their respective Rp and Rd, and devices 310 and 360 will not be able to connect via the USB cable 230. The advertising of respective Rp and Rd are not enabled at the same time. Rp and Rd each have individual series switches configured to enable/disable Rp and Rd according to different clock cycles.

Figure 4:
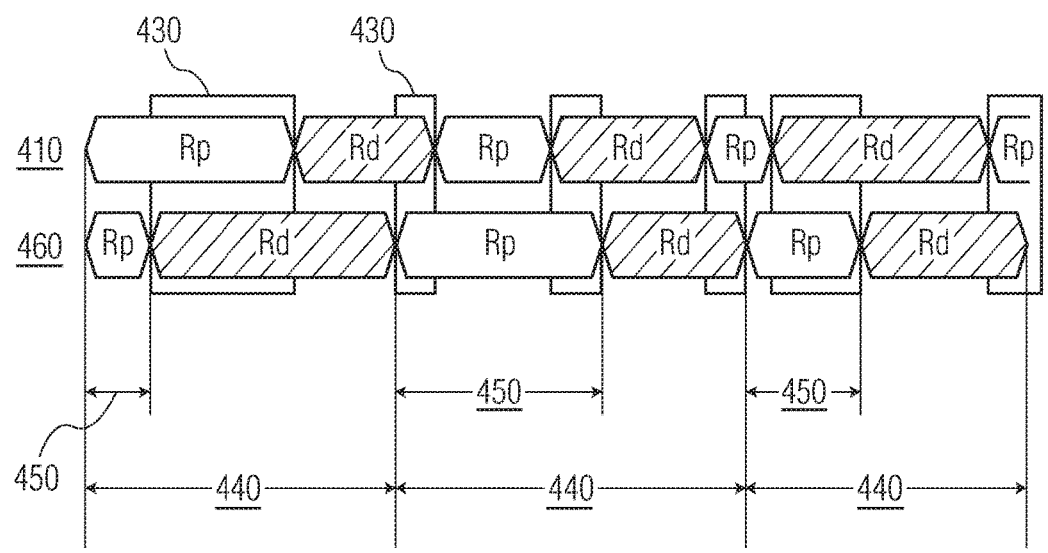
FIG. 4 illustrates a representation of out of sync DRPs in accordance with embodiments described herein.

FIG. 4 illustrates a representation of out of sync DRPs in accordance with embodiments described herein. As illustrated in FIG. 4, a first device advertising a DRP port is represented at 410. A second device advertising a DRP port is represented at 460. As illustrated in FIG. 4, because the two devices 410 and 460 have different values for tDRP and dcSRC.DRP both devices 410 and 460 have more chances to be out of sync in advertising Rp/Rd, which helps to resolve an attach.

Based on the instantaneous random values of the LFSR 145, the design will instantaneously select valid values for tDRP and dcRC.DRP. As both USB devices 410 and 460 pick their own values of tDRP and dcRC.DRP, their alternate Rp/Rd advertisements will quickly become out-of-sync and enable them to get attached into Source/Sink roles.

Contrary to a mirrored pattern illustrated in FIG. 3, the Rp/Rd relationship of the devices 410 and 460 vary in several manners. One manner of variance is the duty cycles of the Rp or Rd advertisement. When a random number for tDRP is generated by the LFSR 145 of the controller 140, a duty cycle of Rp to Rd and back again is determined. The duty cycle of advertisement may be between 50 ms and 100 ms, but there is no set standard cycle. Different random numbers may correspond to duty cycles 440 of varying times as illustrated in FIG. 4.

Another manner of variance is the duration of either Rp or Rd within a given duty cycle. A random number for dcSRC.DRP may be generated by the LFSR 145 of the controller 140. This random number may correspond to a percentage of time Rp or Rd is advertised within a duty cycle 440. The duration of advertisement for either Rp or Rd may be between 30% to 70%, but there is no set standard duration. Different random numbers may correspond to durations 450 of varying length as illustrated in FIG. 4.

An attach may occur between a first interface 215 and a second interface 255 (illustrated in FIG. 2) when an advertised Rp of one DRP overlaps with an advertised Rd of another DRP for a minimum amount of time. Overlapping portions 430 when Rp and Rd may attach are illustrated in FIG. 4. These overlapping portions 430 represent possible attachment occurrences of Rp and Rd that do not mirror each other from devices 410 and 460. Depending on a desired attachment time of a USB cable and desired port, a minimum overlap duration may be set and if the overlapping portion 430 is greater than the minimum duration, USB interfaces will attach via a USB cable.

Embodiments described herein are not limited thereto. Because both devices 210 and 260 may power up at different times, each running on their own clocks, a free-running counter could be used in the controllers 140 instead of the LFSR 145. This free-running counter would come out of reset on the power-on-reset event of that specific device, and continuously count and wrap around. Based on this free-running counter's instantaneous value, the design will instantaneously select valid values for tDRP and dcSRC.DRP that will be different than the values of the other device to which a connection is to be established. This offset in values will also allow both sides get more chances to be out of sync in advertising Rp/Rd, which helps to resolve an attach between a USB cable 230 and electronic device 260. This is another way to randomly select the values of tDRP and dcSRC.DRP. Any other type of random generator may be used to generate random values for tDRP and dcSRC.DRP.

Embodiments described herein may be used in any USB type-C enabled device, for example, Cellular Phone, Tablet, Notebook, Laptop, Desktop, Hub, Connector, Dongle, which supports the Dual-Role Mode as would be known to one skilled in the art.

Although the various embodiments have been described in detail with particular reference to certain aspects thereof, it should be understood that the embodiments described herein are capable of other embodiments and its details are capable of modifications in various obvious respects. As is readily apparent to those skilled in the art, variations and modifications can be effected while remaining within the spirit and scope of the embodiments described herein. Accordingly, the foregoing disclosure, description, and figures are for illustrative purposes only and do not in any way limit the embodiments described herein, which is defined only by the claims.

The invention claimed is:

1. A universal serial bus (USB) circuit, comprising:
 a USB interface configured to transmit and receive power and data;
 a random number generator circuit configured to generate a random number; and
 a controller configured to receive the random number and to select a dual role port (DRP) duty cycle and to select a DRP duration based upon the random number, wherein the DRP duty cycle and DRP duration are used when connecting the USB interface of a first USB type-C DRP device to a USB interface of a second USB type-C DRP device.

2. The USB circuit of claim 1, comprising:
 a configuration channel (CC) line;
 a pull up resistor to pull the CC line to a first voltage source; and
 a pull down resistor to pull the CC line to a second voltage source.

3. The USB circuit of claim 2, comprising:
 a first switch connected between the controller and pull up resistor and a second switch connected between the controller and pull down resistor.

4. The USB circuit of claim 2, comprising:
a third switch connected to the CC line to communicate the DRP duty cycle and DRP duration to the USB interface of the first USB type-C DRP device.

5. The USB circuit of claim 2, wherein the controller alternates a state of the DRP between a first state and a second state, wherein the pull down resistor is connected to the USB interface of the first USB type-C DRP device in the first state and the pull up resistor is connected to the USB interface of the first USB type-C DRP device in second state.

6. The USB circuit of claim 1, wherein the first USB type-C DRP device and the second USB type-C DRP device have different values for the DRP duty cycle and DRP duration.

7. The USB circuit of claim 1, wherein different random numbers correspond to durations of varying length.

8. The USB circuit of claim 1, wherein different random numbers correspond to duty cycles of varying times.

9. A method of connecting a universal serial bus (USB) interface of a first USB type-C DRP device to a USB interface of a second USB type-C DRP device, comprising:
generating a random number by a random number generator circuit in the USB interface of the first device; and
selecting a dual role port (DRP) duty cycle and selecting a DRP duration based upon the random number, wherein the DRP duty cycle and DRP duration are used to connect the USB interface of the first device to the second device.

10. The method of claim 9, wherein an advertised DRP mode of the first device and an advertised DRP mode of the second device are different for a time sufficient for the devices to attach to one another.

11. The method of claim 9, comprising alternating a state of a DRP of the first device between a first state and a second state including connecting a pull down resistor to a USB interface in the first state and connecting a pull up resistor to a USB interface in a second state.

12. The method of claim 9, wherein the first device and the second device have different values for the DRP duty cycle and DRP duration.

13. The method of claim 10, wherein the advertised DRP mode of the first device and the advertised DRP mode of the second device are set based on the random number.

14. A universal serial bus (USB) circuit, comprising:
a USB interface configured to transmit and receive power and data;
a random number generator circuit configured to generate a first random number and a second random number; and
a controller configured to receive the first random number and the second random number and to select a dual role port (DRP) duty cycle based upon the first random number and to select a DRP duration based upon the second random number, wherein the DRP duty cycle and DRP duration are used when connecting the USB interface of a first USB type-C DRP device to a USB interface of a second USB type-C DRP device.

15. The USB circuit of claim 14, comprising:
a configuration channel (CC) line;
a pull up resistor to pull the CC line to a first voltage source; and a pull down resistor to pull the CC line to a second voltage source.

16. The USB circuit of claim 15, comprising:
a first switch connected between the controller and pull up resistor and a second switch connected between the controller and pull down resistor.

17. The USB circuit of claim 15, comprising:
a third switch connected to the CC line to communicate the DRP duty cycle and DRP duration to the USB interface of the first USB type-C DRP device.

18. The USB circuit of claim 15, wherein the controller alternates a state of the DRP between a first state and a second state, wherein the pull down resistor is connected to the USB interface of the first USB type-C DRP device in the first state and the pull up resistor is connected to the USB interface of the first USB type-C DRP device in second state.

19. The USB circuit of claim 14, wherein the first USB type-C DRP device and the second USB type-C DRP device have different values for the DRP duty cycle and DRP duration.

20. The USB circuit of claim 14, wherein different random numbers correspond to duty cycles of varying times.

* * * * *